(12) United States Patent
Murata (10) Patent No.: US 11,053,095 B2
(45) Date of Patent: Jul. 6, 2021

(54) ELEVATOR ALERT SYSTEM

(71) Applicant: Otis Elevator Company, Farmington, CT (US)

(72) Inventor: Jiro Murata, Chibaken (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 665 days.

(21) Appl. No.: 15/969,113

(22) Filed: May 2, 2018

(65) Prior Publication Data
US 2019/0337758 A1 Nov. 7, 2019

(51) Int. Cl.
| | |
|---|---|
| *B66B 5/00* | (2006.01) |
| *G08B 5/36* | (2006.01) |
| *H02K 11/00* | (2016.01) |
| *H02K 7/10* | (2006.01) |
| *F21S 4/24* | (2016.01) |
| *F21V 19/00* | (2006.01) |
| *F21S 9/04* | (2006.01) |

(Continued)

(52) U.S. Cl.
CPC .............. *B66B 5/005* (2013.01); *F21S 4/24* (2016.01); *F21S 9/04* (2013.01); *F21V 19/003* (2013.01); *F21V 19/005* (2013.01); *G08B 5/36* (2013.01); *H02K 7/1004* (2013.01); *H02K 11/0094* (2013.01); *B66B 17/12* (2013.01); *F21W 2131/402* (2013.01); *F21Y 2113/13* (2016.08); *F21Y 2115/10* (2016.08)

(58) Field of Classification Search
CPC ........... B66B 5/005; B66B 7/068; B66B 7/10; B66B 17/12; G08B 5/36; H02K 11/0094; H02K 7/1004; F21S 4/24; F21S 9/04; F21V 19/005; F21V 19/003; F21W 2131/402; F21Y 2115/10; F21Y 2113/13
See application file for complete search history.

(56) References Cited

U.S. PATENT DOCUMENTS

| | | | |
|---|---|---|---|
| 7,954,606 B2 | 6/2011 | Tinone et al. | |
| 8,692,679 B2 | 4/2014 | Brickell | |

(Continued)

FOREIGN PATENT DOCUMENTS

| | | |
|---|---|---|
| CN | 104627767 B | 10/2017 |
| CN | 207158553 U | 3/2018 |

(Continued)

OTHER PUBLICATIONS

Otis, "Otis Gen2 Switch", available at: http://www.otisworldwide.com/site/lb/OT_DL_Documents/OT_DL_DocumentLibrary/Gen2%20Switch/Gen2%20Switch.pdf, accessed May 2, 2018, 13 pages.

(Continued)

*Primary Examiner* — Jeffrey Donels
(74) *Attorney, Agent, or Firm* — Cantor Colburn LLP (57) ABSTRACT

An elevator alert system for alerting a mechanic working inside a hoistway comprises an elevator car vertically movable within a hoistway, a counterweight vertically movable within the hoistway and a compensation member with one end connected to the bottom of the elevator car and the other end connected to the bottom of the counterweight. The compensation member includes at least one light source attached to the compensation member near the elevator car or counterweight. The at least one light source longitudinally extends along the compensation member over a length.

19 Claims, 8 Drawing Sheets

(51) Int. Cl.
    *F21W 131/402*    (2006.01)
    *B66B 17/12*    (2006.01)
    *F21Y 115/10*    (2016.01)
    *F21Y 113/13*    (2016.01)

(56) References Cited

U.S. PATENT DOCUMENTS

| | | | |
|---|---|---|---|
| 9,399,562 | B2 | 7/2016 | Terry et al. |
| 2017/0137256 | A1* | 5/2017 | Meguro ............... B66B 5/005 |
| 2018/0339880 | A1* | 11/2018 | Kattainen ............ B66B 5/0087 |
| 2018/0339881 | A1* | 11/2018 | Kattainen ............ B66B 5/005 |
| 2018/0370763 | A1* | 12/2018 | Kusserow ............ B66B 5/005 |
| 2019/0084796 | A1* | 3/2019 | Buckley ............... B66B 5/0056 |
| 2019/0092601 | A1* | 3/2019 | Tegtmeier ............ B66B 5/005 |

FOREIGN PATENT DOCUMENTS

| | | |
|---|---|---|
| DE | 102016109859 A1 | 11/2017 |
| EP | 3064463 A1 | 9/2016 |
| JP | H06107389 A | 4/1994 |
| JP | H07206320 A | 8/1995 |
| JP | H10265150 A | 10/1998 |
| JP | 2001233560 A | 8/2001 |
| JP | 2003112865 A | 4/2003 |
| JP | 2008056411 A | 3/2008 |
| JP | 2013049541 A | 3/2013 |
| JP | 2014015300 A | 1/2014 |
| WO | 2007018540 A1 | 2/2007 |
| WO | 2017019236 A1 | 2/2017 |
| WO | 2017157469 A1 | 9/2017 |

OTHER PUBLICATIONS

Shahare, Achal, Dr., et al., "Regenerating the Energy from Building Lift", International Journal for Research in Emerging Science and Technology, vol. 2, Issue-4, Apr. 2015, 5 pages.

Chinese Office Action for Application No. 201910359999.1; dated Jul. 23, 2020; 8 Pages.

* cited by examiner

ELEVATOR ALERT SYSTEM

BACKGROUND

This invention generally relates to an elevator system. More particularly, this invention relates to an elevator alert system for alerting a mechanic working inside an elevator hoistway of an approaching elevator car or counterweight.

Maintenance and repair of elevator systems may require a mechanic to enter the elevator hoistway. The mechanic may need to work within the pit at the bottom of the hoistway, on top of the elevator car or at an intermediate location within the hoistway between the pit and the overhead. Mechanics may be faced with dangerous situations caused by an approaching elevator car and/or counterweight.

When working in the pit, the mechanic must avoid collision with either an elevator car or a counterweight moving downward into the pit. There are many ideas to alert the mechanic of an approaching elevator car and/or counterweight. However, there is a need for an effective elevator alert system for alerting a mechanic working in the pit of an approaching elevator car or counterweight which is simple and easy to install in existing elevators.

BRIEF SUMMARY

According to one embodiment of the invention, an elevator alert system for alerting a mechanic working inside a hoistway comprises an elevator car vertically movable within a hoistway, a counterweight vertically movable within the hoistway, a compensation member with one end connected to the bottom of the elevator car and the other end connected to the bottom of the counterweight and at least one light source attached to the compensation member near the elevator car or counterweight. The at least one light source longitudinally extends along the compensation member over a length.

In addition to one or more of the features described above, or as an alternative, further embodiments may be included wherein each light source comprises a first section which extends along a first length and is positioned proximal to the elevator car or counterweight, and a second section which extends along a second length and is positioned distal to the elevator car or counterweight.

In addition to one or more of the features described above, or as an alternative, further embodiments may be included wherein the first section provides a first alert and the second section provides a second alert visually distinguishable from the first alert.

In addition to one or more of the features described above, or as an alternative, further embodiments may be included wherein the first alert warns the mechanic that the elevator should be stopped or the pit of the hoistway should be evacuated and the second alert cautions the mechanic working inside the hoistway that the elevator car or counterweight is approaching.

In addition to one or more of the features described above, or as an alternative, further embodiments may be included wherein the first section includes a red light source and the second section includes a yellow light source.

In addition to one or more of the features described above, or as an alternative, further embodiments may be included wherein the second length is longer than the first length.

In addition to one or more of the features described above, or as an alternative, further embodiments may be included wherein said length is determined based on elevator's running speed.

In addition to one or more of the features described above, or as an alternative, further embodiments may be included wherein the compensation member is a compensation chain or rope.

In addition to one or more of the features described above, or as an alternative, further embodiments may be included wherein the light source is a LED tape which is mechanically attached to the compensation member.

In addition to one or more of the features described above, or as an alternative, further embodiments may be included wherein the light source is a LED tape which is attached to the compensation member by an adhesive.

In addition to one or more of the features described above, or as an alternative, further embodiments may be included wherein the light source is attached to the outer side of the compensation member facing outside the loop defined by the compensation member.

In addition to one or more of the features described above, or as an alternative, further embodiments may be included comprising a dynamo assembly for providing electric power for the light source.

In addition to one or more of the features described above, or as an alternative, further embodiments may be included wherein the dynamo assembly is configured to contact the guide rail or guide roller.

In addition to one or more of the features described above, or as an alternative, further embodiments may be included wherein the dynamo assembly comprises a roller coupled to a dynamo generator by an axle, the roller configured to contact the guide rail or guide roller.

In addition to one or more of the features described above, or as an alternative, further embodiments may be included wherein the dynamo assembly further comprises a biasing means which biases the dynamo assembly toward the guide rail or guide roller.

According to another embodiment of the invention, a method for alerting a mechanic working inside a hoistway, comprises attaching at least one light source to a compensation member with one end connected to the bottom of an elevator car and the other end connected to the bottom of a counterweight and emitting light from the at least one light source to alert the mechanic that the elevator car or counterweight is approaching.

In addition to one or more of the features described above, or as an alternative, further embodiments may be included wherein attaching the at least one light source to the compensation member includes attaching the at least one light source longitudinally along the compensation member over a length near the elevator car or counterweight.

In addition to one or more of the features described above, or as an alternative, further embodiments may be included wherein emitting light from the at least one light source includes emitting different types of light from the at least one light source to provide an alert in two or more levels.

In addition to one or more of the features described above, or as an alternative, further embodiments may be included wherein the different types of light include a first color of light which provides a first emergency alert and a second color of light which provides a second cautioning alert.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

The detailed description explains embodiments of the invention, together with advantages and features, by way of example with reference to the drawings.

DETAILED DESCRIPTION

Figure 1A:
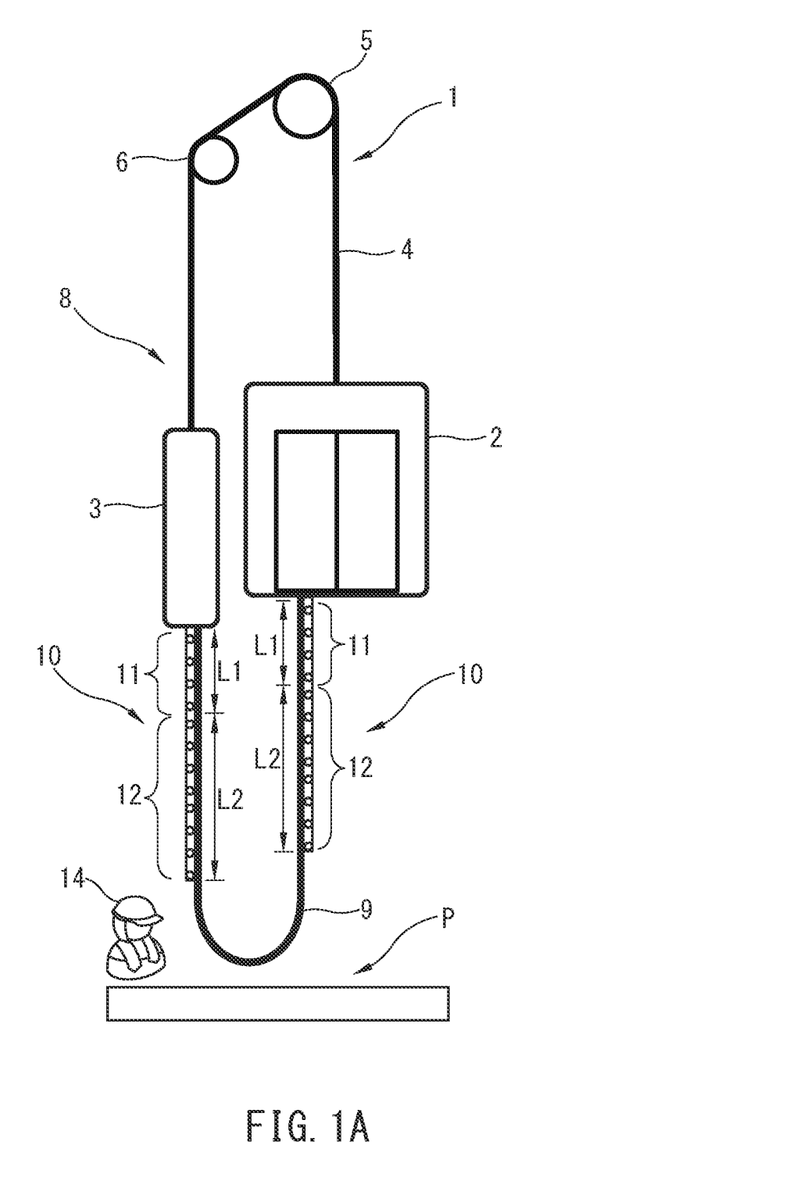
FIGS. 1A and 1B are schematic views of an elevator system including the elevator alert system of the present invention.
Figure 1B:
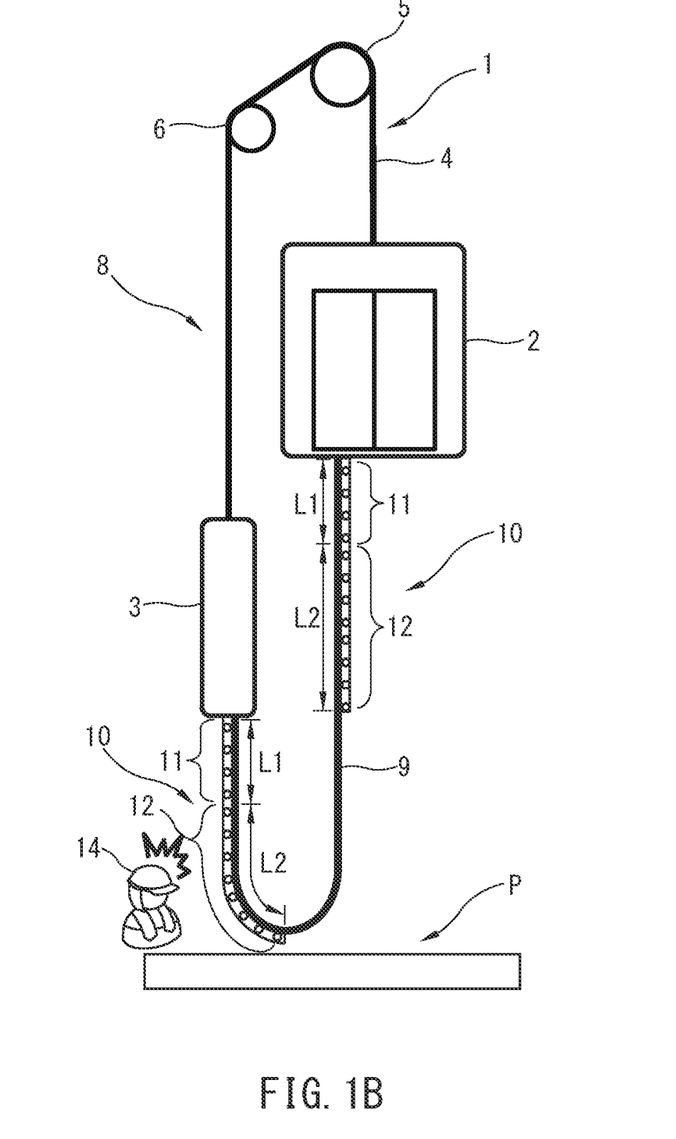

FIGS. 1A and 1B schematically show selected portions of an example elevator system 1. An elevator car 2 is connected to a counterweight 3 by a plurality of hoisting ropes 4. The ropes 4 extend over a traction sheave 5, which is driven by a machine (not shown), and a deflector sheave 6. Traction between the traction sheave 5 and the ropes 4 drives the car 2 and the counterweight 3 vertically through a hoistway 8. The car 2 and counterweight 3 are each guided along T-shaped guide rails 21 (FIGS. 3 and 6) positioned on a hoistway wall at opposite sides of the elevator car 2 and counterweight 3.

At least one compensation chain 9 is provided to compensate for the weight of the hoisting ropes 4 and reduce the load of the machine. In this embodiment two compensation chains 9 are suspended between the bottom of the elevator car 2 and the bottom of the counterweight 3 at both lateral sides of the elevator car 2 and counterweight 3. One end of each compensation chain 9 is connected to the elevator car 2 and the other end of each compensation chain 9 is connected to the counterweight 3. Therefore, the compensation chains 9 each extend in a U-shape.

The configuration of the elevator system components may vary from this example in various aspects. In other words, the invention is not necessarily limited to the example elevator system configuration or the specific components of the illustration.

A light-emitting diode (LED) tape 10 is attached to the compensation chain 9 near the hitch of the elevator car 2 and near the hitch of the counterweight 3 along a length L. The LED tape 10 may be placed on an outer side of the compensation chain 9 facing outside the loop defined by the compensation chain 9 for easy recognition from the outer side of the loop. The LED tape 10 comprises a flexible circuit board populated by surface mounted LEDs as is conventional. The LEDs are aligned in a row on a substrate with an equal spacing between the LEDs.

Although a LED tape 10 is used in this embodiment, any source of light which may be longitudinally attached to the compensation chain 9 either continuously or intermittently may be used in addition to or in place of the LED tape.

The color of the LEDs may change along the length of the LED tape 10. The LED tape 10 may include red LEDs 11 which extend along a length L1 and yellow LEDs 12 which extend along a length L2. The red LEDs 11 may be positioned near the hitch of the elevator car 2 or counterweight 3 and the yellow LEDs 12 may be positioned far from the elevator car 2 or counterweight 3. An example length L of the LED tape 10 is 15 meters, an example length L1 for the red LEDs 11 being 5 meters and an example length L2 for the yellow LEDs 12 being 10 meters, for an elevator which travels 60 meters per minute. This would enable a first alert of 10 seconds via the yellow LEDs 12, cautioning a mechanic 14 in a pit P that the elevator car 2 or counterweight 3 is approaching, and a second alert of 5 seconds via the red LEDs 11, warning the mechanic 14 that the elevator should be stopped or the pit P should be evacuated.

However, the length of the LED tape 10 is determined based on elevator speed. If the speed of the elevator is faster, the LED tape 10 should be longer to ensure a safety distance. Further, the LED tape may include more than three colors or types of LEDs to provide more than three types of warnings.

The LED tape 10 moves together with the compensation chain 9 as the elevator car 2 and counterweight 3 move vertically through the hoistway 8. In FIG. 1B, the counterweight 3 is approaching the pit P and the LED tape 10 has moved into the sight of the mechanic 14 providing a visual alert which may be instantly recognized.

Figure 2:
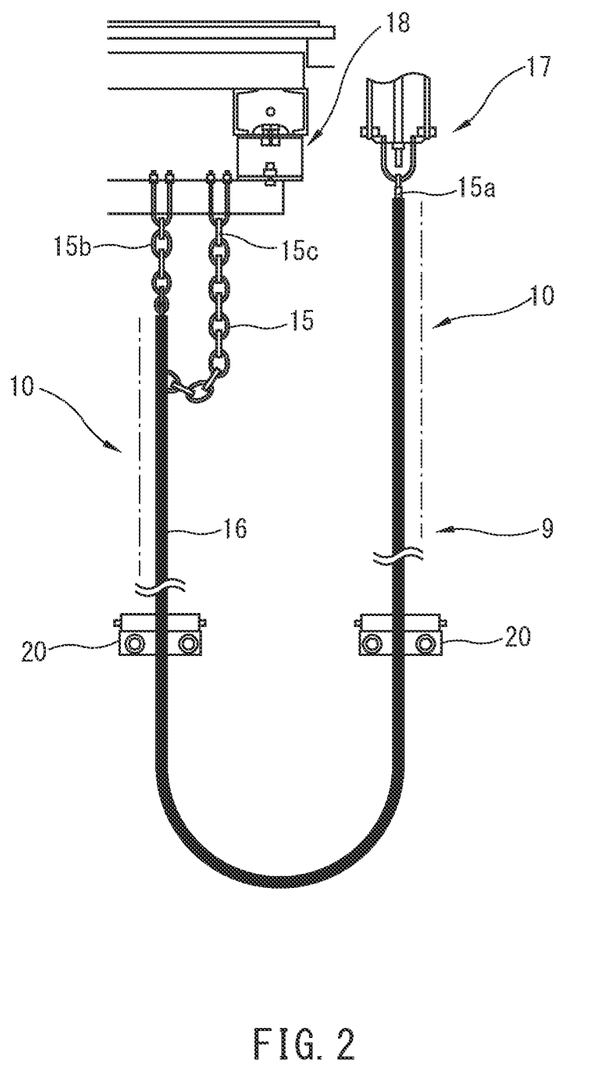
FIG. 2 is a schematic view of a compensation chain of FIG. 1 connected to the elevator car frame and counterweight frame.

FIG. 2 shows details of the compensation chain 9. The LED tape 10 is schematically shown by dotted lines. The compensation chain 9 includes a chain body 15 and a tubular protective layer 16 wrapped around the chain body 15, with the ends of the chain body 15 uncovered for attachment to the elevator car 2 and counterweight 3. The metal chain body 15 is generally made of metal and the protective layer 16 may be made of rubber. A first end 15a of the chain body 15 is connected to a counterweight frame 17 and a second end 15b of the chain body 15 is connected to a car frame 18. The length of the chain body 15 is adjusted at the second end 15b and the remainder of the chain body 15 is connected to the car frame 19 at 15c.

The elevator system 1 further includes at least one compensation chain stabilizing apparatus 20 for restricting swaying of the compensation chain 9. The stabilizing apparatus 20 may be positioned in the pit P near the U-shaped portion of the compensation chain 9. In this embodiment, a pair of stabilizing apparatuses 20 is located both between elevator guide rails and between counterweight guide rails.

Figure 3:
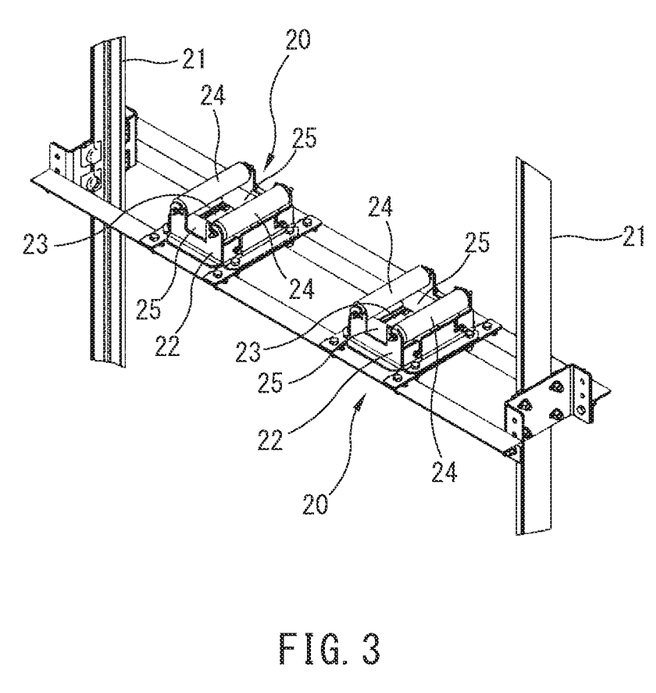
FIG. 3 is a perspective view of the compensation chain stabilization device shown in FIG. 2.

With further reference to FIG. 3, a pair of stabilizing apparatuses 20 is shown mounted on guide rails 21, 21. The guide rails 21, 21 are either elevator guide rails or counterweight guide rails. Each stabilizing apparatus 20 may comprises a rectangular frame 22 with a window 23 for allowing the compensation chain 9 with LED tape 10 to extend therethrough. The window 23 includes a pair of longitudinal rollers 24 and a pair of lateral rollers 25 perpendicular to the longitudinal rollers 24. Under sway conditions, the rollers 24, 25 roll about their axes responsive to contact with the compensation chain 9 to restrict the swaying thereof.

Figure 4:
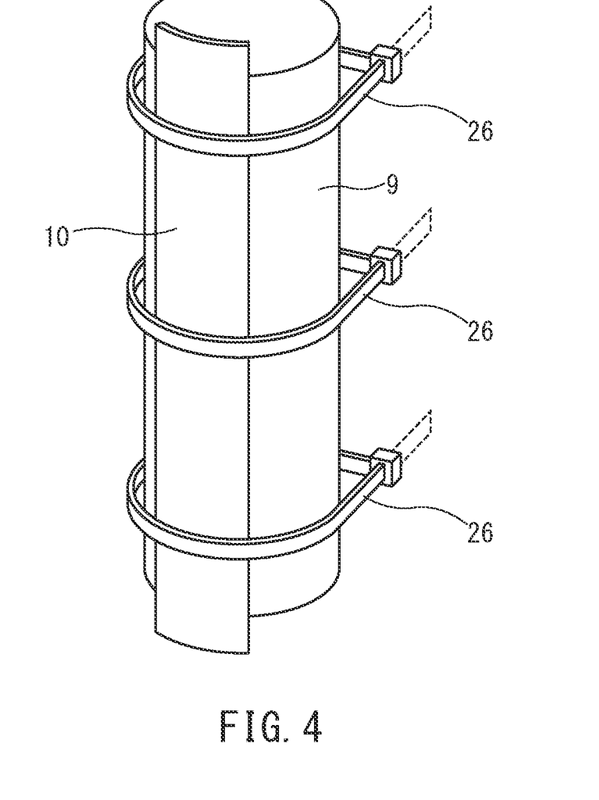
FIG. 4 is a partial view of the compensation chain of FIG. 1 showing how the LED tape is attached to the compensation chain.
Figure 5:
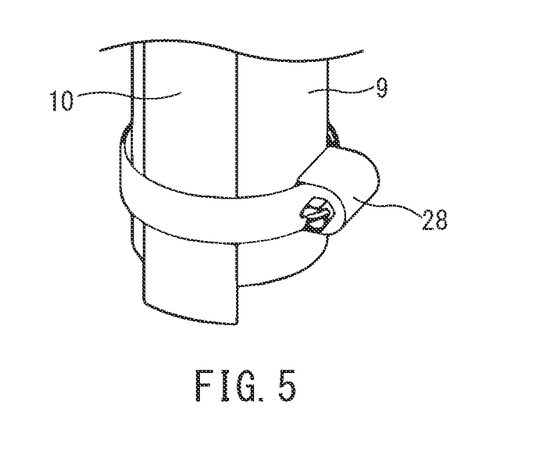
FIG. 5 is a partial view of the compensation chain of FIG. 1 showing another example of how the LED tape is attached to the compensation chain.

FIG. 4 shows an example of how the LED tape 10 is attached to the compensation chain 9. In this embodiment, the LED tape 10 is attached to the compensation chain 9 via cable ties 26. As shown in FIG. 5, a hose clamp 28 may also be used in place of a cable tie 26. The cable tie 26 may be made of a resin material and the hose clamp 28 may be made of metal, for example. It is also possible to attach the LED tape 10 to the compensation chain 9 by an adhesive or an adhesive tape. The LED tape 10 may also be adhesive-backed.

Figure 6:
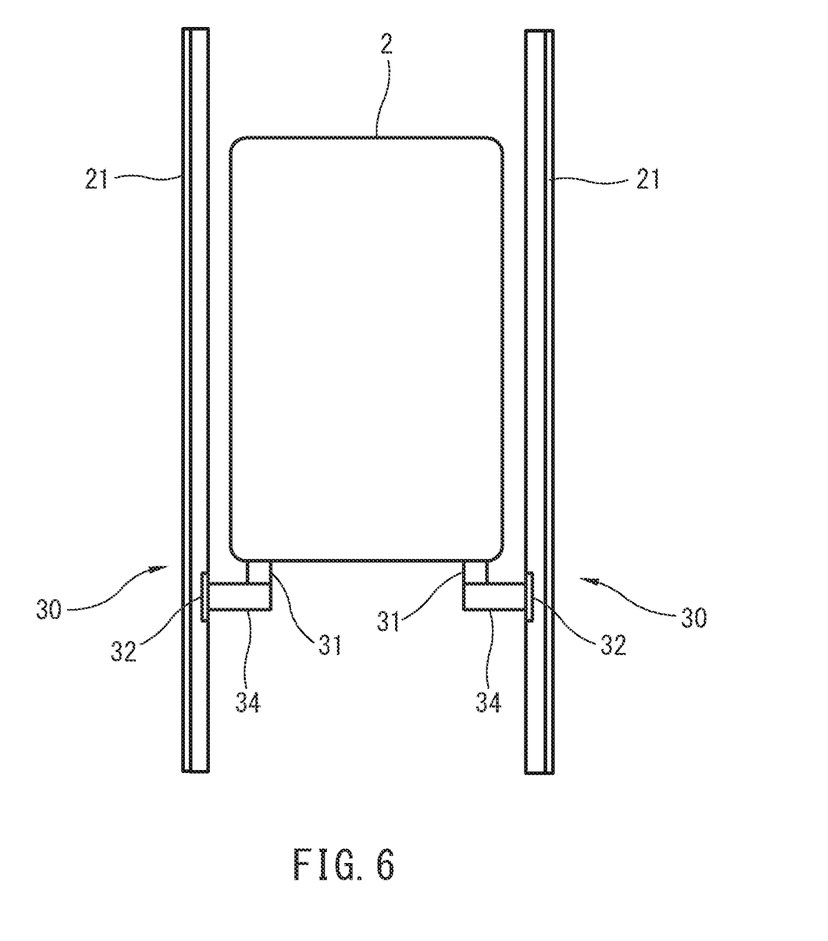
FIG. 6 is a schematic view of the elevator car of FIG. 1 showing a dynamo assembly.

The LED tape 10 may be powered by a generator such as a dynamo generator mounted on the car 2 and counterweight 3. FIG. 6 shows an exemplary elevator car 2 guided along guide rails 21, 21 and including a dynamo assembly 30 which may be mounted below the elevator car 2 on the frame thereof via a bracket 31. The dynamo assembly 30 may be provided on both lateral sides of the elevator car 2 to provide power to a respective LED tape 10. Although the dynamo assembly 30 is explained in relation to an elevator car 2, the same applies to a counterweight 3.

The dynamo assembly 30 is configured to contact the face of the guide rail 21 and to generate electrical power as the elevator car 2 moves along the guide rail 21. The exemplary dynamo assembly 30 includes a roller 32 coupled to a dynamo generator 34 by an axle 35 (FIG. 8) as is conventional. The roller 32 is configured to contact and roll against the face of the guide rail 21. The roller 32 and the dynamo generator 34 are coupled by the axle 35 such that rotation of the roller 32 actuates rotation of the dynamo generator 34, thereby generating electrical power. Since power is generated only when the elevator is moving, the LED tapes 10 are lighted anytime the elevator is moving regardless of direction. The roller 32 may alternatively be configured to contact a roller of a roller guide (not shown) for guiding the elevator car along the guide rails 21.

Figure 7:
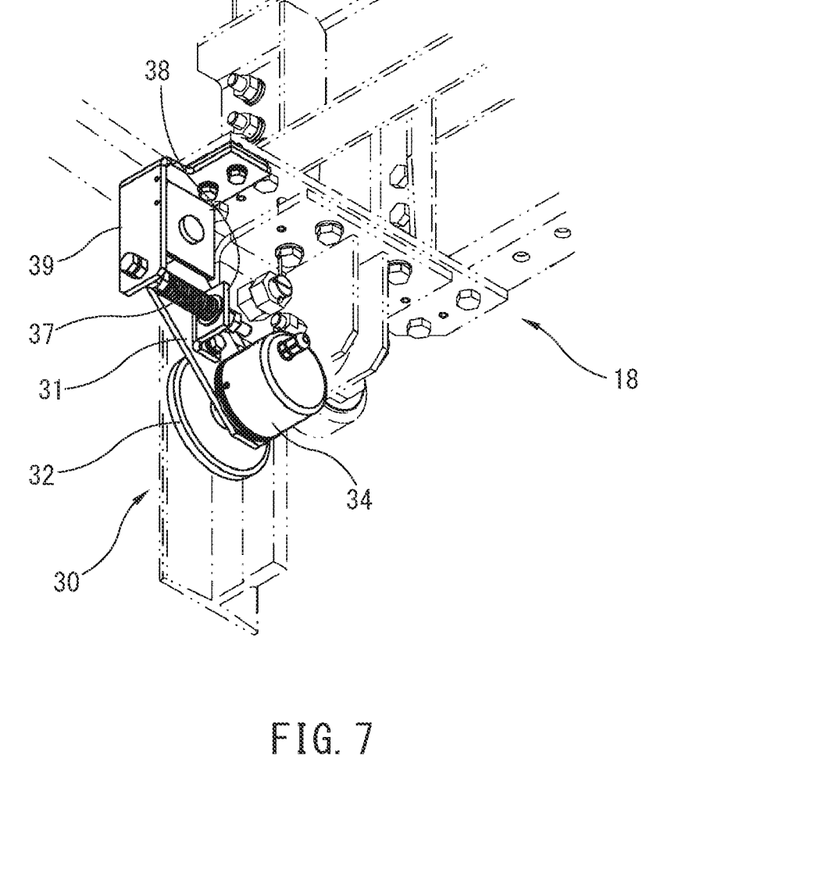
FIG. 7 is a perspective view of the dynamo assembly of FIG. 6 fixed to an elevator car frame.
Figure 8:
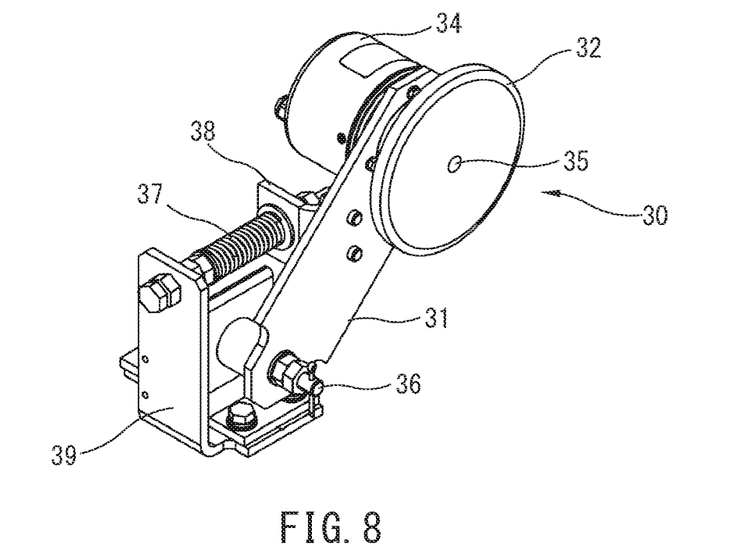
FIGS. 8 and 9 are perspective views of the dynamo assembly of FIG. 7.
Figure 9:
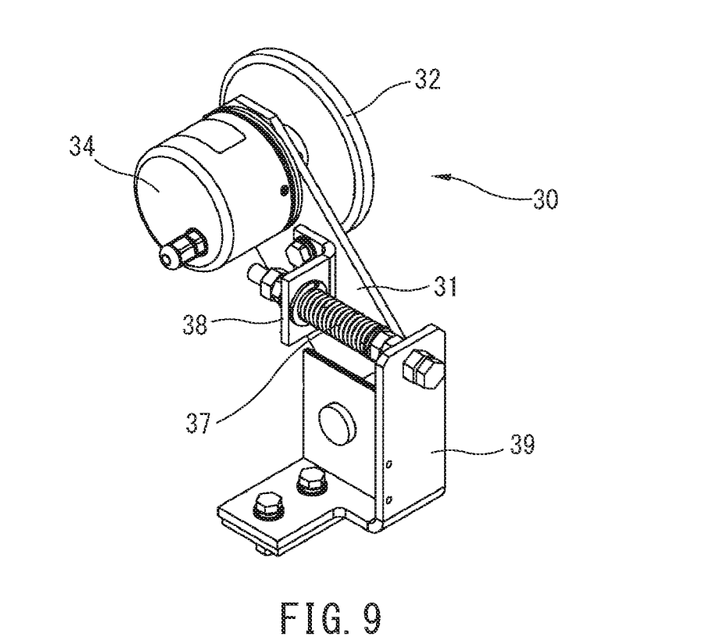

FIGS. 7 to 9 show further details of the dynamo assembly 30. Each dynamo assembly 30 is mounted on the frame 18 of the elevator car 2 via the bracket 31 which is configured to rotate about an axis 36, as shown in FIG. 8. A biasing means 37 which may be a spring is provided between a bracket 38 fixed to the bracket 31 proximate the dynamo assembly 30 and a bracket 39 fixed to the frame of the elevator car 2. The spring 37 is configured to bias the dynamo assembly 30 toward the guide rail 21 so that the roller 32 reliably contacts the guide rail 21 and actuates the dynamo generator 34.

The elevator alert system of the present invention is simple and easy to install in existing elevators without requiring additional batteries, switches or control boards. LED tapes 10 are commercially available and can be easily installed on existing compensation chains 9. Dynamo assemblies 30 are well known and can be easily retrofitted to existing elevators. The elevator alert system of the present invention is also inexpensive and maintenance free since a failure of the LED or dynamo assembly 30 has no affect on the elevator system 1.

By providing LED tapes 10 on a compensation chain 9, the present invention allows easy recognition of the approaching of an elevator car 2 or counterweight 3. Although the LED tape 10 is provided on a compensation chain 9 in the present invention, the LED tape 10 may be provided on a compensation rope or even on a governor rope, for example.

According to another embodiment of the invention, a method for alerting a mechanic 14 working inside a hoistway 8 is provided which comprises attaching at least one light source 10 to a compensation member 9 with one end connected to the bottom of an elevator car 2 and the other end connected to the bottom of a counterweight 3 and emitting light from the at least one light source 10 to alert the mechanic 14 that the elevator car 2 or counterweight 3 is approaching.

Attaching the at least one light source 10 to the compensation member 9 may include attaching the at least one light source 10 longitudinally along the compensation member 9 over a length near the elevator car 2 or counterweight 3. Emitting light from the at least one light source 10 may include emitting different types of light from the at least one light source 10 to provide an alert in two or more levels. The different types of light may include a first color of light which provides a first emergency alert and a second color of light which provides a second cautioning alert.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An elevator alert system for alerting a mechanic working inside a hoistway, comprising:
    an elevator car vertically movable within a hoistway;
    a counterweight vertically movable within the hoistway;
    a compensation member with one end connected to the bottom of the elevator car and the other end connected to the bottom of the counterweight; and
    at least one light source attached to the compensation member near the elevator car or counterweight, wherein the at least one light source longitudinally extends along the compensation member over a length.

2. The elevator alert system of claim 1, wherein each light source comprises a first section which extends along a first length and is positioned proximal to the elevator car or counterweight, and a second section which extends along a second length and is positioned distal to the elevator car or counterweight.

3. The elevator alert system of claim 2, wherein the first section provides a first alert and the second section provides a second alert visually distinguishable from the first alert.

4. The elevator alert system of claim 3, wherein the first alert warns the mechanic that the elevator should be stopped or the pit of the hoistway should be evacuated and the second alert cautions the mechanic working inside the hoistway that the elevator car or counterweight is approaching.

5. The elevator alert system of claim 4, wherein the first section includes a red light source and the second section includes a yellow light source.

6. The elevator alert system of claim 4, wherein the second length is longer than the first length.

7. The elevator alert system of claim 1, wherein said length is determined based on elevator's running speed.

8. The elevator alert system of claim 1, wherein the compensation member is a compensation chain or rope.

9. The elevator alert system of claim 1, wherein the light source is a LED tape which is mechanically attached to the compensation member.

10. The elevator alert system of claim 1, wherein the light source is a LED tape which is attached to the compensation member by an adhesive.

11. The elevator alert system of claim 1, wherein the light source is attached to the outer side of the compensation member facing outside the loop defined by the compensation member.

12. The elevator alert system of claim 1, further comprising a dynamo assembly for providing electric power for the light source.

13. The elevator alert system of claim 12, wherein the dynamo assembly is configured to contact a guide rail or guide roller.

14. The elevator alert system of claim 13, wherein the dynamo assembly comprises a roller coupled to a dynamo generator by an axle, the roller configured to contact the guide rail or guide roller.

15. The elevator alert system of claim 14, wherein the dynamo assembly further comprises a biasing means which biases the dynamo assembly toward the guide rail or guide roller.

16. A method for alerting a mechanic working inside a hoistway, comprising:
    attaching at least one light source to a compensation member with one end connected to the bottom of an elevator car and the other end connected to the bottom of a counterweight; and
    emitting light from the at least one light source to alert the mechanic that the elevator car or counterweight is approaching.

17. The method of claim 16, wherein attaching the at least one light source to the compensation member includes attaching the at least one light source longitudinally along the compensation member over a length near the elevator car or counterweight.

18. The method of claim 16, wherein emitting light from the at least one light source includes emitting different types of light from the at least one light source to provide an alert in two or more levels.

19. The method of claim 18, wherein the different types of light include a first color of light which provides a first emergency alert and a second color of light which provides a second cautioning alert.

* * * * *